United States Patent
Frank

(10) Patent No.: US 9,344,283 B2
(45) Date of Patent: May 17, 2016

(54) CAPTCHA IMAGE SCRAMBLE

(75) Inventor: Jonathan Frank, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/532,665

(22) Filed: Jun. 25, 2012

(65) Prior Publication Data
US 2012/0266215 A1    Oct. 18, 2012

Related U.S. Application Data

(63) Continuation of application No. 12/720,470, filed on Mar. 9, 2010, now Pat. No. 8,209,743.

(51) Int. Cl.
*H04L 29/00* (2006.01)
*H04L 9/32* (2006.01)
*G09C 5/00* (2006.01)

(52) U.S. Cl.
CPC ............ *H04L 9/3271* (2013.01); *G09C 5/00* (2013.01)

(58) Field of Classification Search
USPC ....................................... 726/2, 5, 22, 26–29
See application file for complete search history.

(56) References Cited

U.S. PATENT DOCUMENTS 8,189,781 B1 *   5/2012 Hartman ................ 380/210
2011/0029902 A1 * 2/2011 Bailey .................... 715/764

OTHER PUBLICATIONS

Abram Hindle, Michael Godfrey, Richard Holt/ Reverse Engineering CAPTCHAs/ 2008/ IEEE Xplore/ pp. 59-68.*

* cited by examiner

*Primary Examiner* — Jeffrey Pwu
*Assistant Examiner* — Michael D Anderson
(74) *Attorney, Agent, or Firm* — Baker Botts L.L.P.

(57) ABSTRACT

Particular embodiments determine a modified image for a CAPTCHA. The CAPTCHA may include an original image, a challenge based on the original image, and/or a correct response based on the original image. The modified image may be a scrambled version of the original image. Web-browser-executable code is determined for unscrambling the modified image back to the original image. The modified image and the web-browser-executable code are then provided to a computing device. Upon receiving the modified image and the web-browser-executable code, the computing device then displays the original image based on the modified image and the web-browser-executable code.

20 Claims, 5 Drawing Sheets following finding

FIGURE 3A
← 310

← 301  ← 302  ← 303  ← 304  ← 305  ← 306 following finding
← 310

FIGURE 3B

← 306  ← 301  ← 305  ← 303  ← 302  ← 304 ing fefindwinllow

FIGURE 3C
← 320

CAPTCHA IMAGE SCRAMBLE

RELATED APPLICATIONS

This application is a continuation of and claim the benefit of priority of U.S. application Ser. No. 12/720,470, filed on Mar. 9, 2010, titled "Captcha Image Scramble."

TECHNICAL FIELD

The present disclosure generally relates to scrambling a CAPTCHA image prior to transmitting it to a computing device in order to prevent malicious software from tricking a human user of the computer device into unwittingly providing a correct CAPTCHA response.

BACKGROUND

A CAPTCHA, or Captcha, is a type of challenge-response test used to determine whether the response is generated by a non-human entity (e.g., a computer or a piece of software executing on a computer). The test is based on the assumption that a human's ability in pattern recognition is much superior than that of a machine's, at least for the present. In a typical scenario, a CAPTCHA test involves presenting one or more images to a testee (i.e., the person being tested) together with a challenge (i.e., a question). The challenge is related to the images presented to the testee and generally requires the testee to recognize some form of pattern in the images. The testee needs to provide a correct response to the challenge in order to pass the test.

FIGS. 1A and 1B illustrate two sample CAPTCHA tests 110 and 120. In FIG. 1A, CAPTCHA test 110 includes an image 111 of a distorted text string. Note that texts may be considered a special form of image. A challenge 112 asks the testee to recognize the distorted text string and enter it in a response field 113. In order to pass the test, the testee must enter the correct text string shown in image 111 (i.e., "F8 BpdG"). In FIG. 1B, CAPTCHA test 120 includes an image 121 of an animal. A challenge 122 asks the testee to recognize the animal and describe it in a response field 123. In order to pass the test, the testee must correctly identify the animal shown in image 121 (i.e., a cat).

A Completely Automated Public Turing Test to Tell Computers and Humans Apart ("CAPTCHA"), or Captcha, is a type of challenge-response test used to determine whether the response is generated by a non-human entity (e.g., a computer or a piece of software executing on a computer), The test is based on the assumption that a human's ability in pattern recognition is much superior than that of a machine's, at least for the present. In a typical scenario, a CAPTCHA test involves presenting one or more images to a testee (i.e., the person being tested) together with a challenge (i.e., a question). The challenge is related to the images presented to the testee and generally requires the testee to recognize some of pattern the images. The testee needs to provide a correct response to the challenge in order to pass the test.

SUMMARY

The present disclosure generally relates to scrambling a CAPTCHA image prior to transmitting it to a computing device in order to prevent malicious software from tricking a human user of the computer device into unwittingly providing a correct CAPTCHA response.

In particular embodiments, at a first computing device, accessing a first image of a CAPTCHA, wherein the CAPTCHA comprises: the first image; a challenge based on the first image; and a correct response based on the first image; constructing a second image by scrambling the first image, comprising: cutting the first image into a plurality of image sections; recording positions of the image sections in the first image; and randomly rearranging the image sections to construct the second image; generating web-browser-executable code for unscrambling the second image back to the first image, wherein the web-browser-executable code indicates, for each one of the image sections in the second image, the position of the image section in the first image; and transmitting the second image and the web-browser-executable code to a second computing device.

In particular embodiments, at a second computing device, receiving a second image and web-browser-executable code from a first computing device, wherein: the second image is constructed by randomly rearranging a plurality of image sections of a first image of a CAPTCHA; the CAPTCHA comprises the first image, a challenge based on the first image; and a correct response based on the first image; and the web-browser-executable code indicates, for each one of the image sections in the second image, a position of the image section in the first image; and displaying the first image based on the second image and the web-browser-executable code.

These and other features, aspects, and advantages of the disclosure are described in more detail below in the detailed description and in conjunction with the following figures.

BRIEF DESCRIPTION OF THE DRAWINGS

FIGS. 3A-3C illustrate an exemplary CAPTCHA image and its scrambling process.

DETAILED DESCRIPTION

Figure 1B:
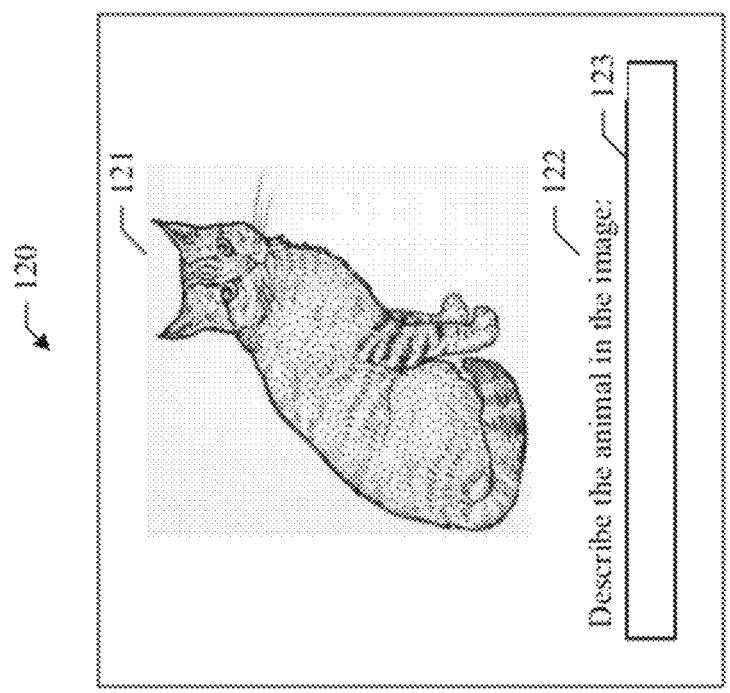
FIGS. 1A and 1B illustrate two exemplary CAPTCHA tests.
Figure 1A:
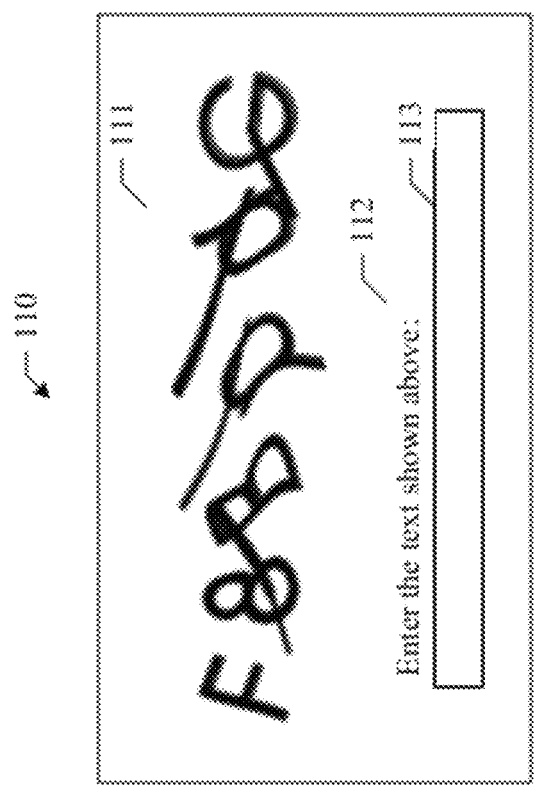

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

CAPTCHAs are used to distinguish a human from a non-human entity, such as computer software or "bots", because a human's ability in pattern recognition is much superior than that of a machine's. In general, a CAPTCHA test may include an image, a challenge, and a correct response. The image and the challenge are presented to a testee, and the testee passes the test by providing the correct response.

CAPTCHAs are often used to prevent malicious software (malware) from harming computer systems. In a typical scenario, suppose a computer system allows its human users to perform certain actions (e.g., signing up for user accounts, posting messages, or establishing social connections with other users). To ensure that the actions are really performed by the human users, the computer system may issue a CAPTCHA test to an entity when the entity wishes to perform a particular action. The entity is required to provide the correct CAPTCHA response in order to proceed further. The computer system completely performs the action only when the correct response to the CAPTCHA test is provided by the entity. When the entity is not a human user, such as a piece of malware, because the malware is unable to automatically determine the correct CAPTCHA response from processing the CAPTCHA image, the malware is unable to provide the correct CAPTCHA response to the computer system. As a result, the requested action is not performed, and the malware is prevented from causing harm to the computer system.

Malware continuously finds new means to get around computer security. In the case of CAPTCHAs, for example, suppose a piece of malware has infected a client device and is executing on the client device. The malware attempts to perform an action on a server with which the client device is connected via a network (e.g., the Internet) without the knowledge or consent of the human user of the client device. The server issues a CAPTCHA test to the client device, and the image and the challenge of the CAPTCHA test are included, for example, in a web page so that they may be displayed in a web browser executing on the client device. Since malware is unable to automatically determine a correct response from processing an image of a CAPTCHA test, it may find a way to trick a human user into providing the correct response, and then use that response to pass the CAPTCHA test. For example, suppose a piece of malware wants to perform an action on a computer system or cause a computer system to perform an action. As a part of the security measure, the computer system issues a CAPTCHA test. The malware is unable to determine the correct response on its own. Thus, it may trick a human user into giving the correct response. The malware may use a pop-up window to show the CAPTCHA image to the human user together with a message, asking the human user to provide the correct CAPTCHA response. To give additional incentive, the malware may, in the message, falsely state that unless the correct CAPTCHA response is provided, something undesirable may occur to the human user's computer system. The human user, believing the message to be legitimate, responds to the message by providing the correct CAPTCHA response. The malware may then use the correct CAPTCHA response provided by the human user to get around the security measure of the computer system and completes the action.

To address this issue, particular embodiments may scramble the image of a CAPTCHA test before transmitting it to a computer system. This way, even if a piece of malware tricks a human user into unwittingly providing a response to the CAPTCHA test, because the CAPTCHA image has been scrambled and the malware may not be able to unscramble it, the response provided by the human user is given based on the scrambled (assuming the user is able to perceive anything in the scrambled version of the CAPTCHA image), incorrect CAPTCHA image, not the original, correct CAPTCHA image, and therefore is not the correct response to the CAPTCHA test. Thus, the malware cannot pass the CAPTCHA test using this incorrect response.

Figure 2:
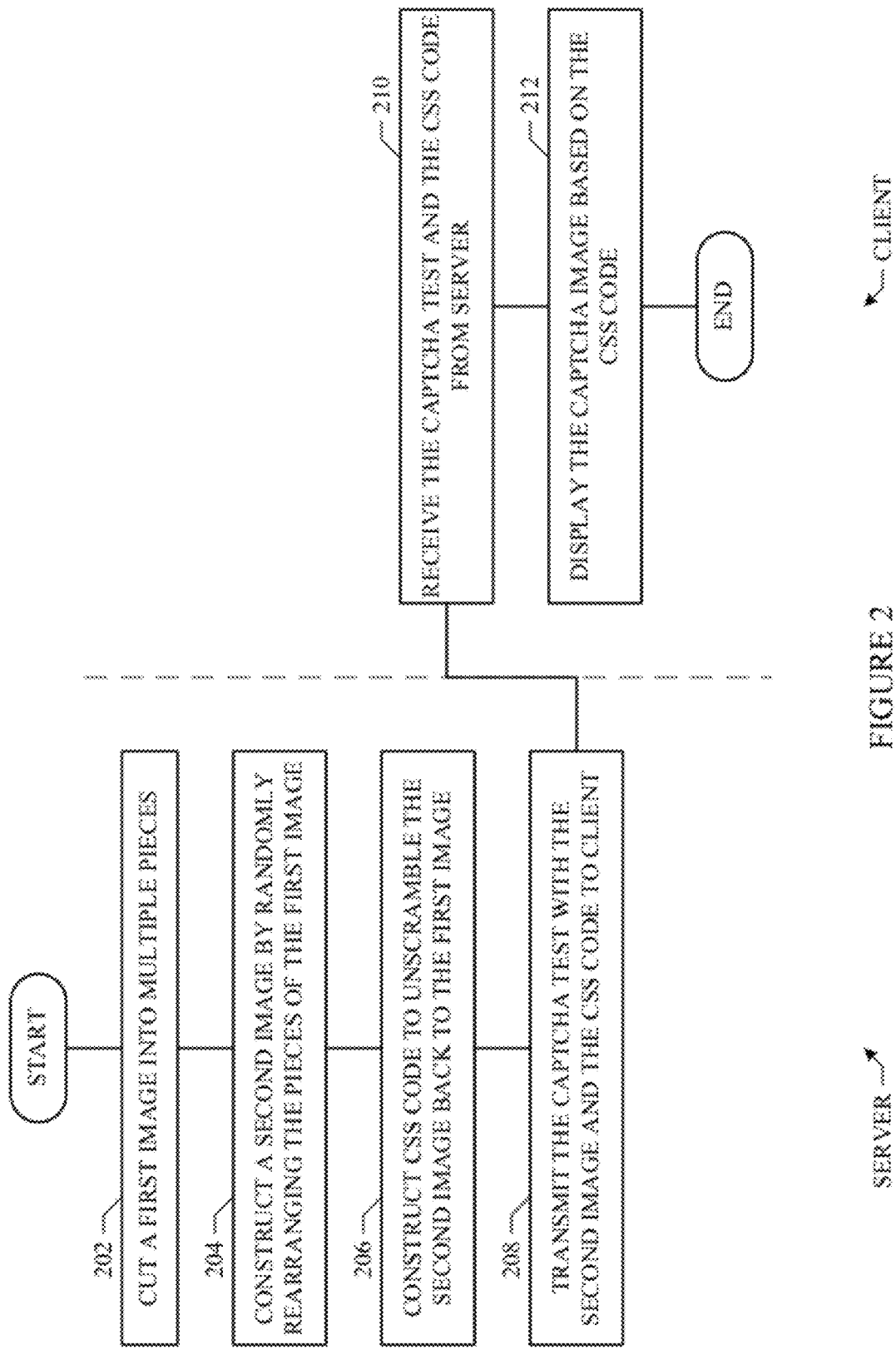
FIG. 2 illustrates an exemplary method of scrambling the image of a CAPTCHA test.

FIG. 2 illustrates an example method of scrambling an image of a CAPTCHA test. Although the steps of FIG. 2 are illustrated as being performed on a server and a client, the same steps may be performed on any two computer systems or on the same computer system. The steps of FIG. 2 are described using examples illustrated in FIGS. 3A-3C.

At the server, particular embodiments may cut a first image into a random number of sections (as illustrated in FIG. 2, step 202). This first image is the original, correct image that is used to construct a CAPTCHA test. That is, a CAPTCHA test, which includes the first image, a challenge, and a correct response has been constructed, and the challenge and the correct response of the CAPTCHA test are based on this first image. The first image may be cut horizontally or vertically or both, and the individual sections may have the same or different dimensions. FIG. 3A illustrates an example CAPTCHA image 310. Let CAPTCHA image 310 be an example of the first image. CAPTCHA image 310 may be a bit map, a JPEG, or any other suitable image file format. In FIG. 3B, CAPTCHA image 310 is cut into six sections 301-306 vertically, again, as an example. Particular embodiment may assign a unique identifier (e.g., a numerical identifier) to each section.

Particular embodiments may construct a second image by randomly rearranging the sections of the first image (as illustrated in FIG. 2, step 204). The second image may have the same or different number of sections as the first image. In particular embodiments, the second image may have the same dimension (i.e., width and height) as the first image. FIG. 3C illustrates an example image 320 obtained by randomly rearranging the six sections of CAPTCHA image 310. In this example, the six sections are arranged as: the sixth section, followed by the first section, followed by the fifth section, followed by the third section, followed by the second section, and followed by the fourth section. When constructing the second image, particular embodiments may insert additional image sections not belonging to the first image into the second image, or particular embodiments may repeat some of the image sections of the first image in the second image. For example, image section 301 may be included twice or three times in the second image.

Cascading Style Sheets (CSS) is a style sheet language used to describe the presentation semantics (e.g., the look and format) of a document written in a markup language. CSS is commonly used to style web pages written in Hyper Text Markup Language (HTML) and Extensible Hyper Text Markup Language (XHTML). In particular, CSS includes functionalities that support the formatting (e.g., alignment) of images. Particular embodiments may take advantage of these CSS functionalities and construct CSS code to unscramble the second image back to the first image correctly when it is display in a web browser (as illustrated in FIG. 2, step 206).

When the first image is cut into multiple sections, each image section is assigned a unique identifier. These identifiers may be used to identify the individual image sections in the CSS and HTML code. When randomly rearranging the image sections to construct the second image, particular embodiments may record the original positions of the image sections in the first image. Using FIGS. 3B and 3C as an example, the first section in image 320 is originally the sixth section in image 310 (image section 306); the second section in image 320 is originally the first section in image 310 (image section 301); the third section in image 320 is originally the fifth section in image 310 (image section 305); the fourth section in image 320 is originally the third section in image 310 (image section 303); the fifth section in image 320 is originally the second section in image 310 (image section 302); and the sixth section in image 320 is originally the fourth section in image 310 (image section 304). Thus, to unscramble image 320 back to image 310, the CSS code needs to reverse the process and indicate that when the image is displayed, the first section in image 320 should appear in the position of the sixth section; the second section in image 320 should appear in the position of the first section; the third section in image 320 should appear in the position of the fifth section; the fourth section in image 320 should appear in the position of the third section; the fifth section in image 320 should appear in the position of the second section; and the sixth section in image 320 should appear in the position of the fourth section.

Particular embodiments may specify the image sections using the "li" tag of HTML. Assuming image sections 301-306 each have a width of 50 pixels, the following illustrates an example HTML and CSS code for unscrambling the second image (e.g., image 320) back to the first image (e.g., image 310).

```
<ul class="ul_scrambled_image">
    <li class="li_captcha_scramble" id="captcha_scramble_1"></li>
    <li class="li_captcha_scramble" id="captcha_scramble_2"></li>
    <li class="li_captcha_scramble" id="captcha_scramble_3"></li>
    <li class="li_captcha_scramble" id="captcha_scramble_4"></li>
    <li class="li_captcha_scramble" id="captcha_scramble_5"></li>
    <li class="li_captcha_scramble" id="captcha_scramble_6"></li>
</ul>
```

HTML Code

```
<style>
.li_captcha_scramble{
  background: url(/captcha_image.jpeg) 0 0 no-repeat;
}
#captcha_scramble_1{
  left: 0px;
  background-position: -50px 0px;
  width: 50px;
}
#captcha_scramble_2{
  left: 50px;
  background-position: -200px 0px;
  width: 50px;
}
#captcha_scramble_3{
  left: 100px;
  background-position: -150px 0px;
  width: 50px;
}
#captcha_scramble_4{
  left: 150px;
  background-position: -250px 0px;
  width: 50px;
}
#captcha_scramble_5{
  left: 200px;
  background-position: -100px 0px;
  width: 50px;
}
#captcha_scramble_6{
  left: 250px;
  background-position: -0px 0px;
  width: 50px;
}
</style>
```

CSS Code

Particular embodiments may transmit the CAPTCHA test and the HTML and CSS code to a client (as illustrated in FIG. 2, step 208). The CAPTCHA test is constructed using the first image. That is, the challenge and the correct response are determined based on the first image. However, only the second, scrambled image is transmitted to the client with the CAPTCHA test. The first image is not transmitted to the client.

At the client, upon receiving the CAPTCHA test and the HTML and CSS code as part of a web page or other structured document (as illustrated in FIG. 2, step 210), the CAPTCHA image, together with the challenge, may be displayed in a web browser based on the HTML and CSS code (as illustrated in FIG. 2, step 212). The client only receives the second, scrambled image from the server. However, because the web browser is able to process the HTML and CSS code, the CAPTCHA image is displayed based on the CSS code and the CSS code indicates how the second image may be unscrambled back to the first image, when the CAPTCHA image is displayed in the web browser, the first, correct image appears. As a result, a human user sees the first, correct image and may provide the correct response accordingly. For CAPTCHA image 310, the correct response is "following finding".

On the other hand, suppose, at the client, a piece of malware receives the CAPTCHA test with the second, scrambled image. Because the malware does not have the functionality to unscramble the second image back to the first image using the CSS code, the malware displays the second image as the CAPTCHA image, hoping to trick a human user into providing the correct CAPTCHA response. As a result, the human user sees the second, scrambled image and is unable to provide the correct response, which has been determined using the first, correct image. For example, when a human user sees image 320, he may not be able to determine what the two words are, or at best may believe the two words to be "ing fefindwimllon", which is of course incorrect. In addition, if the image sections are configured to be small enough, the human user may not be able to perceive anything intelligible from the scrambled CAPTCHA image at all. The malware cannot pass the CAPTCHA test using this incorrect response (if any) (e.g., sending this incorrect response back to the computer system issuing the CAPTCHA test).

Alternatively, in particular embodiments, the unscrambling of the CAPTCHA image may be achieved using JavaScript or other types of scripting language that are supported by a web browser. In this case, the JavaScript code replaces the CSS code to specify the placements of the image sections so that, when displayed (e.g., in a web browser), the first image appears.

Figure 4:
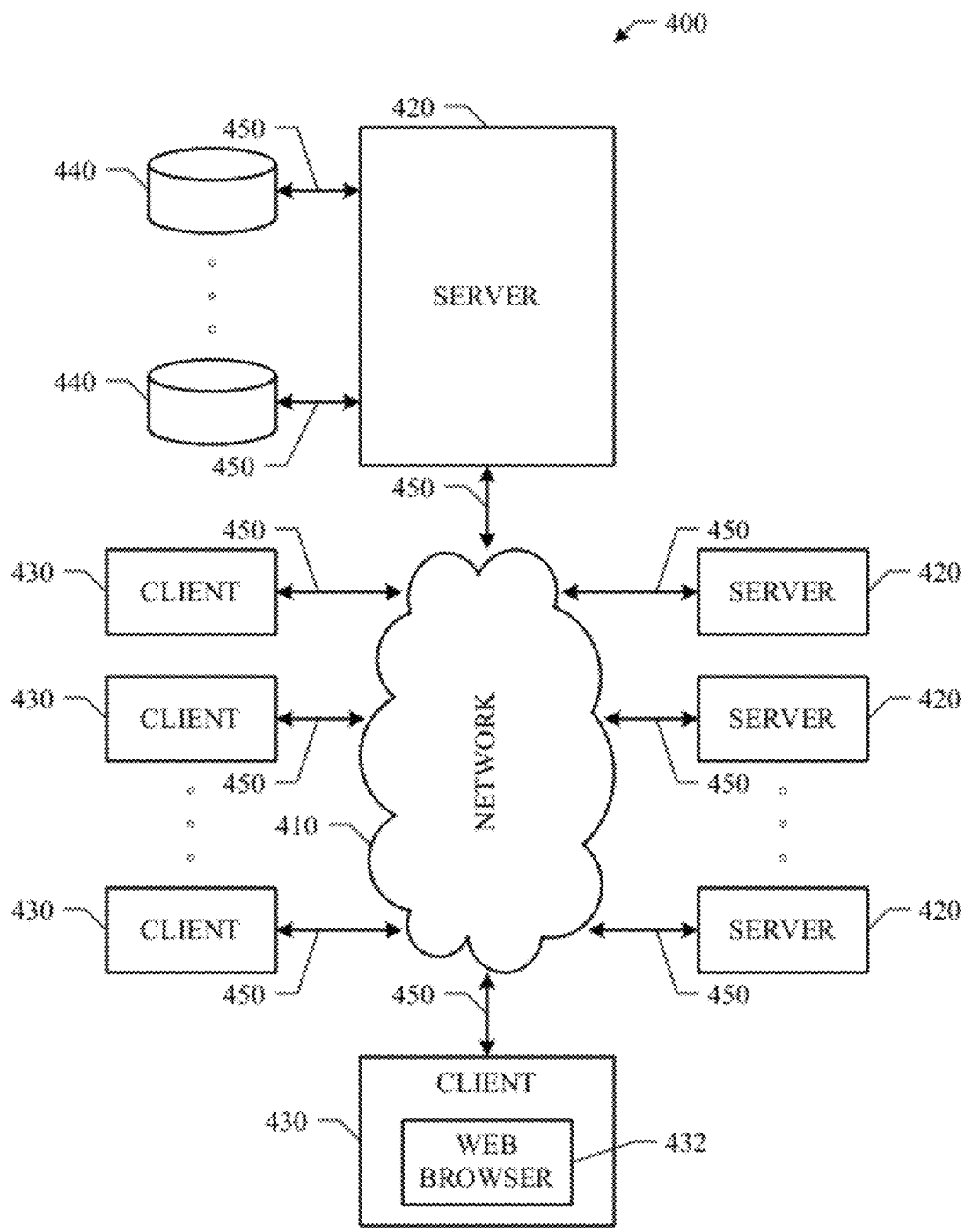
FIG. 4 illustrates an exemplary network environment.

Particular embodiments may be implemented in a network environment. FIG. 4 illustrates an example network environment 400 suitable for providing software validation as a service. Network environment 400 includes a network 410 coupling one or more servers 420 and one or more clients 430 to each other. In particular embodiments, network 410 is an intranet, an extranet, a virtual private network (VPN), a local area network (LAN), a wireless LAN (WLAN), a wide area network (WAN), a metropolitan area network (MAN), a portion of the Internet, or another network 410 or a combination of two or more such networks 410. The present disclosure contemplates any suitable network 410.

One or more links 450 couple a server 420 or a client 430 to network 410. In particular embodiments, one or more links 450 each includes one or more wireline, wireless, or optical links 450. In particular embodiments, one or more links 450 each includes an intranet, an extranet, a VPN, a LAN, a WLAN, a WAN, a MAN, a portion of the Internet, or another link 450 or a combination of two or more such links 450. The present disclosure contemplates any suitable links 450 coupling servers 420 and clients 430 to network 410.

In particular embodiments, each server 420 may be a unitary server or may be a distributed server spanning multiple computers or multiple datacenters. Servers 420 may be of various types, such as, for example and without limitation, web server, news server, mail server, message server, advertising server, file server, application server, exchange server, database server, or proxy server. In particular embodiments, each server 420 may include hardware, software, or embedded logic components or a combination of two or more such components for carrying out the appropriate functionalities implemented or supported by server 420. For example, a web server is generally capable of hosting websites containing web pages or particular elements of web pages. More specifically, a web server may host HTML files or other file types, or may dynamically create or constitute files upon a request, and communicate them to clients 430 in response to HTTP or other requests from clients 430. A mail server is generally capable of providing electronic mail services to various clients 430. A database server is generally capable of providing an interface for managing data stored in one or more data stores.

In particular embodiments, one or more data storages 440 may be communicatively linked to one or more servers 420 via one or more links 450. In particular embodiments, data storages 440 may be used to store various types of information. In particular embodiments, the information stored in data storages 440 may be organized according to specific data structures. In particular embodiment, each data storage 440 may be a relational database. Particular embodiments may provide interfaces that enable servers 420 or clients 430 to manage, e.g., retrieve, modify, add, or delete, the information stored in data storage 440.

In particular embodiments, each client 430 may be an electronic device including hardware, software, or embedded logic components or a combination of two or more such components and capable of carrying out the appropriate functionalities implemented or supported by client 430. For example and without limitation, a client 430 may be a desktop computer system, a notebook computer system, a netbook computer system, a handheld electronic device, or a mobile telephone. The present disclosure contemplates any suitable clients 430. A client 430 may enable a network user at client 430 to access network 430. A client 430 may enable its user to communicate with other users at other clients 430.

A client 430 may have a web browser 432, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 430 may enter a Uniform Resource Locator (URL) or other address directing the web browser 432 to a server 420, and the web browser 432 may generate a Hyper Text Transfer Protocol (HTTP) request and communicate the HTTP request to server 420. Server 420 may accept the HTTP request and communicate to client 430 one or more Hyper Text Markup Language (HTML) files responsive to the HTTP request. A HTML file may include CSS code. Client 430 may render a web page based on the HTML files from server 420 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 5:
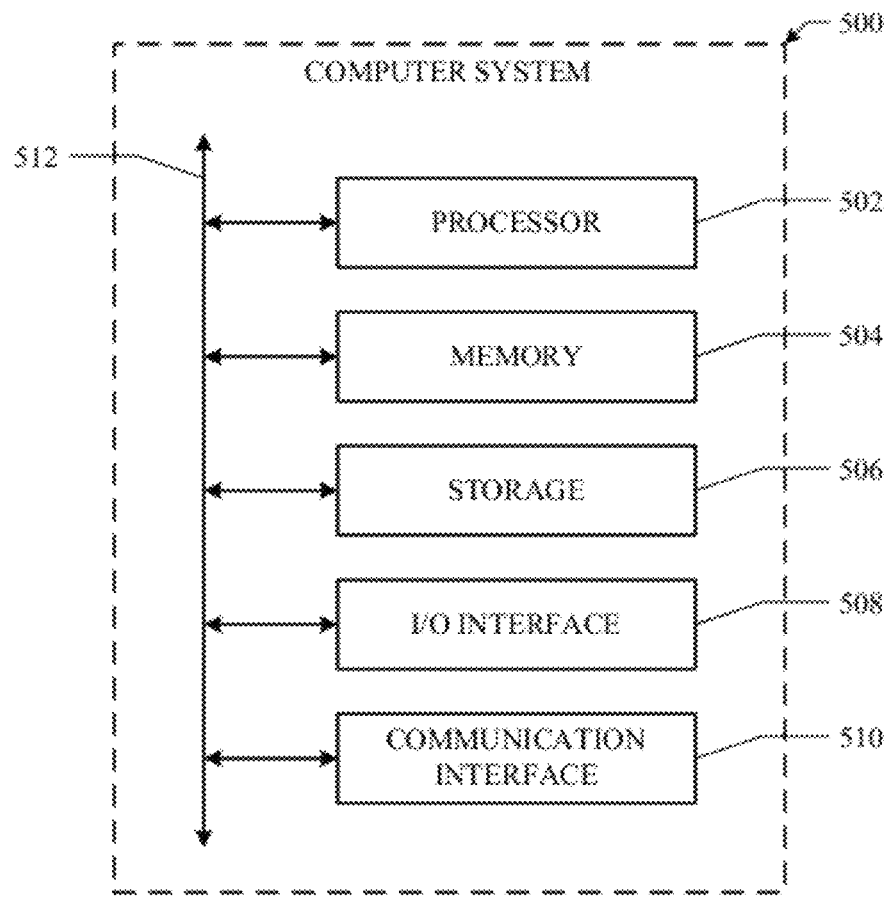
FIG. 5 illustrates an exemplary computer system.

Particular embodiments may be implemented on one or more computer systems. FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. The present disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. The present disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 502 (such as, for example, one or more internal registers or caches), one or more portions of memory 504, one or more portions of storage 506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
    determining, using one or more processors, a static modified image for a Completely Automated Public Turing Test to Tell Computers and Humans Apart (CAPTCHA), the CAPTCHA comprising:
        an original image comprising a plurality of image sections arranged in a first order;
        the static modified image comprising each of the image sections of the original image arranged in a second order in addition to one or more of:
            one or more image sections of a different image unrelated to the original image; or
            one or more repetitions of one or more of the image sections of the original image;
        a challenge based on the original image; and
        a correct response based on the original image;
    generating, using the processors, based on the original image and the first order, web-browser-executable code for unscrambling the static modified image back to the original image, wherein the web-browser-executable code is based at least in part on a plurality of unique identifiers that are each assigned to one of the image sections; and
    sending the static modified image and the web-browser-executable code to a computing device.

2. The method of claim 1, wherein the plurality of image sections of the original image were determined by was scrambled by cutting the original image into the plurality of image sections, wherein one or more cuts are made horizontally, vertically, or both horizontally and vertically.

3. The method of claim 2, wherein the unique identifiers for each image section are assigned after cutting the original image.

4. The method of claim 1, further comprising:
    constructing Hyper Text Markup Language (HTML) code that lists each one of the image sections comprising the static modified image; and
    providing the HTML code to the computing device.

5. The method of claim 1, wherein the web-browser-executable code indicates, for each one of the image sections in the static modified image, the position of the image section in the original image.

6. The method of claim 1, wherein the web-browser-executable code includes Cascading Style Sheets (CSS) code.

7. The method of claim 1, wherein the second order comprises a random rearrangement of the first order.

8. The method of claim 1, further comprising providing the challenge to the computing device.

9. A computer server comprising:
    one or more processors; and
    a memory coupled to the processors comprising instructions executable by the processors, the processors being operable when executing the instructions to:

determine a static modified image for a Completely Automatic Public Turing Test to Tell Computers and Humans Apart (CAPTCHA), the CAPTCHA comprising:
- an original image comprising a plurality of image sections arranged in a first order;
- the static modified image comprising each of the image sections of the original image arranged in a second order in addition to one or more of:
  - one or more image sections of a different image unrelated to the original image; or
  - one or more repetitions of one or more of the image sections of the original image;
- a challenge based on the original image; and
- a correct response based on the original image;

generate, based on the original image and the first order, web-browser-executable code for unscrambling the static modified image back to the original image, wherein the web-browser-executable code is based at least in part on a plurality of unique identifiers that are each assigned to one of the image sections; and send the static modified image and the web-browser-executable code to a computing device.

10. The computer server of claim 9, wherein the plurality of image sections of the original image were determined by was scrambled by cutting the original image into the plurality of image sections, wherein one or more cuts are made horizontally, vertically, or both horizontally and vertically.

11. The computer server of claim 10, wherein the unique identifiers for each image section are assigned after cutting the original image.

12. The computer server of claim 9, wherein the processors are further operable when executing the instructions to:
- construct HyperText Markup Language (HTML) code that lists each one of the image sections in the modified image; and
- provide the HTML code to the computing device.

13. The computer server of claim 9, wherein the web-browser-executable code includes Cascading Style Sheets (CSS) code.

14. The computer server of claim 9, wherein the web-browser-executable code indicates, for each one of the image sections in the static modified image, the position of the image section in the original image.

15. The computer server of claim 9, wherein the second order comprises a random rearrangement of the first order.

16. The computer server of claim 9, wherein the processors are further operable when executing the instructions to provide the challenge to the computing device.

17. A computing device comprising:
- one or more processors; and
- a memory coupled to the processors comprising instructions executable by the processors, the processors being operable when executing the instructions to:
  - receive a static modified image and web-browser-executable code, wherein:
    - the static modified image comprises a plurality of image sections arranged in a second order, the plurality of image sections corresponding to an original image, in addition to one or more of:
      - one or more image sections of a different image unrelated to the original image; or
      - one or more repetitions of one or more of the image sections of the original image;
    - a CAPTCHA Completely Automated Public Turing Test to Tell Computers and Humans Apart (CAPTCHA) comprises the original image comprising the plurality of image sections arranged in a first order, a challenge based on the original image, and a correct response based on the original image; and
    - the web-browser-executable code generated based on the original image is based at least in part on a plurality of unique identifiers that are each assigned to one of the image sections, wherein the identifiers indicate, for each one of the image sections in the static modified image, a position of the image section in the original image; and
  - display the original image based on the static modified image and the web-browser-executable code.

18. The computing device of claim 17, wherein the web-browser-executable code comprises Cascading Style Sheets (CSS) code.

19. The computing device of claim 17, wherein the processors are further operable when executing the instructions to:
- receive the challenge; and
- display the challenge with the original image.

20. The computing device of claim 19, wherein the processors are further operable when executing the instructions to:
- receive a response to the challenge from a human user of the computing device; and
- provide the response to an original computing device in response to the CAPTCHA.

* * * * *